United States Patent [19]
Adachi et al.

[11] Patent Number: 5,093,606
[45] Date of Patent: Mar. 3, 1992

[54] ULTRASONIC MOTOR DRIVING CIRCUIT

[75] Inventors: Yoshihiro Adachi, Hamakita; Masahiko Komoda, Toyohashi, both of Japan

[73] Assignee: Asmo Co., Ltd., Kosai, Japan

[21] Appl. No.: 676,799

[22] Filed: Mar. 28, 1991

[30] Foreign Application Priority Data

Apr. 20, 1990 [JP] Japan .................................. 2-102914

[51] Int. Cl.⁵ ............................................. H01L 41/08
[52] U.S. Cl. ..................................... 318/116; 310/316
[58] Field of Search ............... 310/316, 317, 323, 328; 318/116

[56] References Cited

U.S. PATENT DOCUMENTS 4,749,896  6/1988  Suzuki et al. ...................... 310/316

Primary Examiner—Mark O. Budd
Attorney, Agent, or Firm—Reinhart, Boerner, Van Deuren, Norris & Rieselbach

[57] ABSTRACT

A driving circuit for an ultrasonic motor is disclosed which utilizes a single transformer. A phase shifter frequency-divides the signal from an oscillator by N and generates a plurality of frequency divide signals having different phases. These divided signals are then used to control the driving of the piezoelectric element used to power the ultrasonic motor.

11 Claims, 6 Drawing Sheets

ULTRASONIC MOTOR DRIVING CIRCUIT

This application claims the priority of Japanese Patent Application No. 2-102914 filed on Apr. 20, 1990, which is incorporated herein by reference.

BACKGROUND OF THE INVENTION

1. Field of the Invention

The present invention generally relates to an ultrasonic motor. More particularly, the present invention pertains to a driving circuit for an ultrasonic motor to control the voltage that drives the ultrasonic motor.

2. Description of the Related Art

A conventional ultrasonic motor includes a stator on which multiple piezoelectric elements are provided, and a rotatably supported rotor that is pressed against the stator. Each piezoelectric element of the motor is separated into two portions to which high frequency voltages of different phases are applied. In accordance with the applied high frequency voltages, a progressive wave is generated on the surface of the stator, which serves to rotate the rotor.

This type of ultrasonic motor also has a driving circuit to control the high frequency voltages for driving the rotor, as seen, for example, in FIG. 7. In this driving circuit, a signal is generated at a monitor electrode 22 provided at part of each piezoelectric element 21, and is sent through an automatic tracking circuit (ATC) 23 to an oscillator 24. This oscillator 24 generates an oscillation signal in accordance with the received signal. The oscillation signal from the oscillator 24 is divided into two signals having different phases. These signals are independently amplified by switching circuits 26a and 26b, transformers 27a and 27b and the like. High frequency voltages whose phases are different from each other are applied to the respective portions of the piezoelectric element 21.

Since the signals are amplified independently in the above-described driving circuit, however, two sets of switching circuits as well as two transformers are required. The driving circuit is therefore undesirably large. Further, to drive multiple motors, multiple driving circuits have to be provided for each motor, with two transformers being provided for each driving circuit. This makes it difficult to provide a compact circuit to drive a plurality of motors.

SUMMARY OF THE INVENTION

Accordingly, it is a primary objective of the present invention to provide a driving circuit for an ultrasonic motor, which is made compact by using a single transformer therein.

It is another objective of the present invention to provide a driving circuit for multiple ultrasonic motors, which uses a single transformer.

To achieve the foregoing and other objects and in accordance with the purpose of the present invention, an improved driving circuit is provided for an ultrasonic motor. The driving circuit includes an oscillator, a switching element, a transformer, a rectifier, a phase shifter, and a pair of switching circuits. The ultrasonic motor comprises a stator, a rotor supported rotatable on the stator, and piezoelectric elements provided on the stator each having two separated portions. The rotor is driven when high frequency voltages of different phases are applied to the respective portions of each piezoelectric element.

The oscillator outputs a signal whose frequency is N times as high as the frequency of the high frequency voltages to drive the motor. The switching element outputs a switching signal upon reception of the signal from the oscillator. The primary coil of the transformer has one end connected to a DC power source, and the other end connected to the switching element. The secondary coil of the transformer generates an AC voltage according to the signal output from the switching element with respect to the primary coil. The rectifier transforms the AC voltage from the secondary coil into a DC voltage. The DC voltage is applied to the piezoelectric elements of the motor.

The phase shifter frequency-divides the signal from the oscillator by N, generates two or more signals of different phases based on the frequency-divided signal, and outputs the signals separately. Based on one of the signals from the phase shifter, the first switching circuit selects a voltage to be applied to one portion of each piezoelectric element. Likewise, the second switching circuit selects a voltage to be applied to the second portion of each piezoelectric element, based on the second signal from the phase shifter. The first and second switching circuits may be switching elements.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

The first through fourth preferred embodiments of the present invention will now be described referring to the accompanying drawings.

FIRST EMBODIMENT

Figure 1:
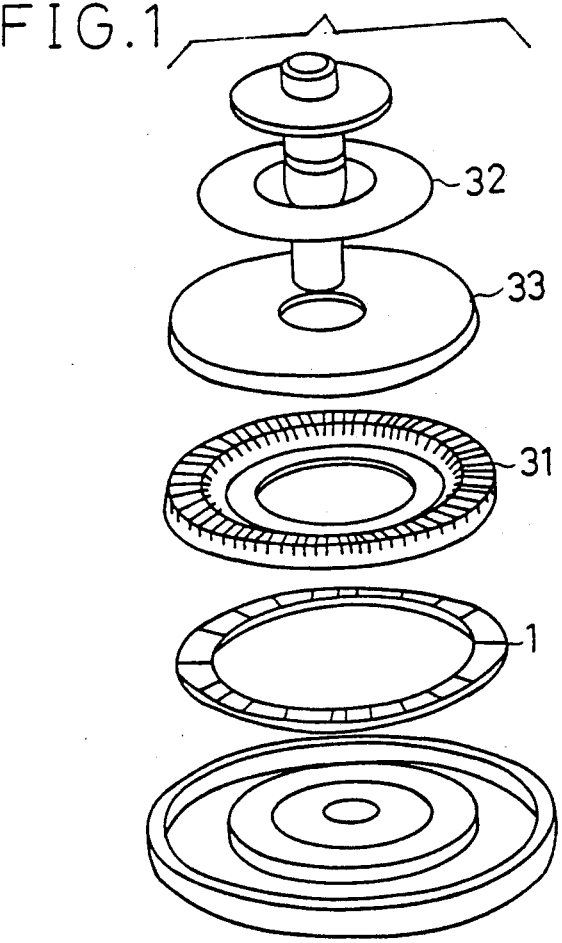
FIG. 1 is an exploded perspective view illustrating the structure of an ultrasonic motor used in the first to fourth embodiments of the present invention.

As shown in FIG. 1, an ultrasonic motor that is driven by the driving circuit of this embodiment includes a stator 31 made of an elastic member, and a rotor 33 which is rotatably supported as it is pressed against the stator 31 by a spring 32. A ring-shaped piezoelectric element 1 is tightly attached to the underside of the stator 31.

Figure 2:
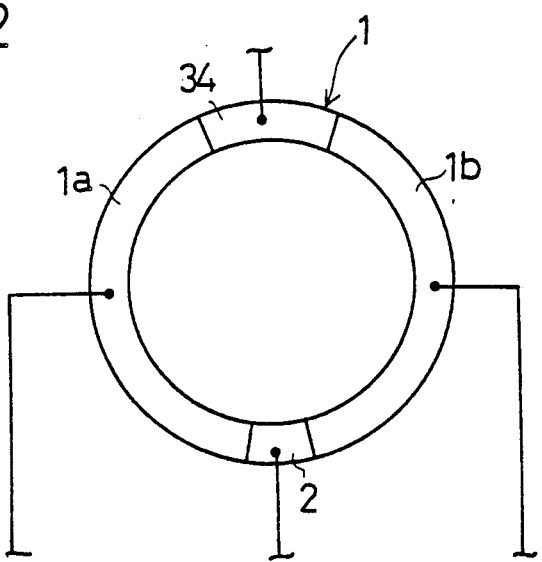
FIG. 2 is a plan view of a piezoelectric element employed in the first to fourth embodiments.

As shown in FIG. 2, the piezoelectric element 1 is divided into two portions 1a and 1b, respectively corresponding to A and B phases. A monitor electrode 2 is located between the A phase portion 1a and the B phase portion 1b of the piezoelectric element 1. When high frequency voltages having different phases are respectively applied to the A phase portion 1a and the B phase portion 1b, each of the portions 1a and 1b repeats expansion and contraction movements alternately, thus generating a progressive wave on the surface of the stator 31. The progressive wave serves to rotate the rotor 33 attached to the stator 31.

Figure 3:
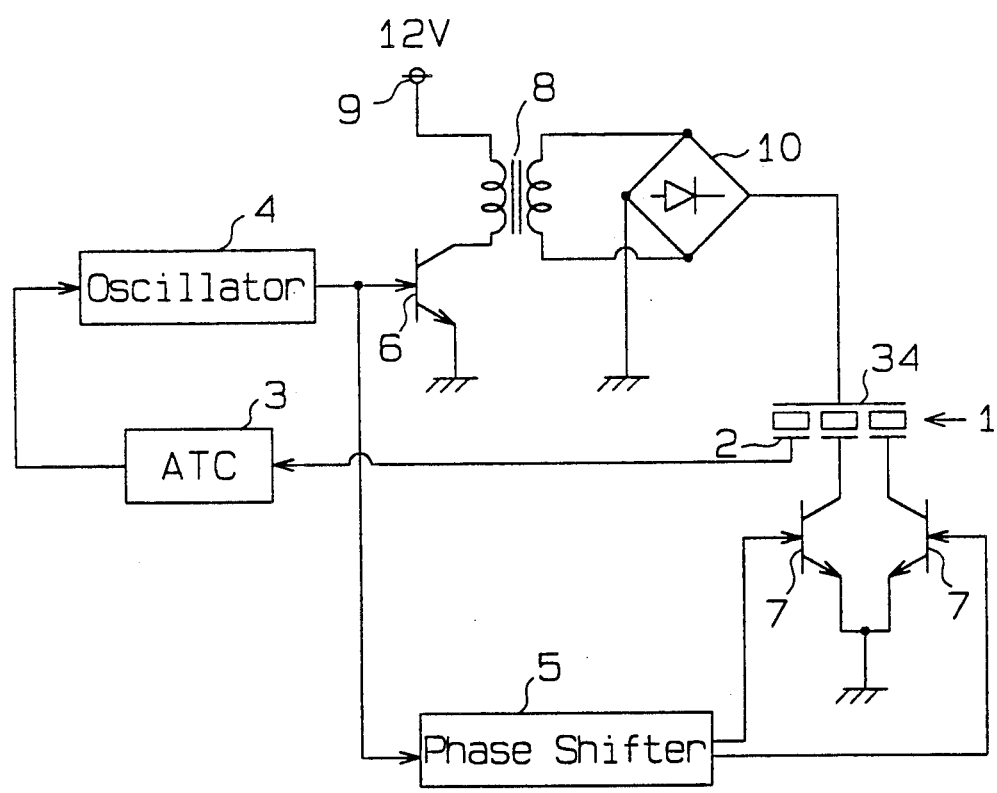
FIG. 3 is a circuit diagram illustrating a driving circuit of the first embodiment.

The motor driving circuit, which applies a high frequency voltage to each piezoelectric element 1 will now be described. As shown in FIG. 3, a signal according to a monitor voltage generated at the monitor electrode 2 of the piezoelectric element 1 is sent to an ATC 3. The ATC 3 sets the necessary frequency to rotate the rotor at a predetermined rotational speed taking into account, the temperature and the load on the motor, etc. The ATC 3 sends a control signal to an oscillator 4 based on the signal from the monitor electrode 2.

Based on the control signal from the ATC 3, the oscillator 4 sends a signal of a predetermined frequency (160 kHz in this embodiment) to a phase shifter 5 and a switching element 6 for driving a transformer.

The phase shifter 5 has output terminals respectively connected to two switching elements 7 which serve to control voltages to be applied to the piezoelectric elements 1. The phase shifter 5 divides the frequency of the signal from the oscillator 4 by four, and separates the resultant signal into two signals of different phases (40 kHz). The phase shifter 5 sends these signals from its output terminals to the respective switching elements 7.

The switching elements 7 are each connected to the portions 1a and 1b of each piezoelectric element 1. Based on the signal received from the phase shifter 5, each switching element 7 repeats the ON/OFF switching to charge the portions 1a and 1b of the piezoelectric element 1 with electric charge, and discharge them of the charge accumulated therein.

The switching element 6 is connected to one end of the primary coil of a transformer 8. The other end of the primary coil is connected to a DC power source 9 of 12 V. When the primary coil is applied with a current in response to the signal from the switching element 6, a high AC voltage will be generated in the secondary coil of the transformer 8. A bridge-shaped rectifier 10 converts the AC voltage to a DC voltage, which is applied to a center electrode 34 of the piezoelectric element 1, connected to the rectifier 10. Since the center electrode 34 is coupled to the portions 1a and 1b of the piezoelectric element 1, charges are supplied to the portions 1a and 1b from the rectifier 10.

Based on the switching operation of the switching element 7, the associated piezoelectric element 1 is repeatedly charged from the rectifier 10 or discharged of the charge accumulated therein. In accordance with this charge/discharge operation of the piezoelectric element 1, the portions 1a and 1b alternately vibrate. As a result, a progressive wave is generated on the surface of the stator 31 and the rotor 31 is rotated.

Since the driving circuit of this embodiment has only one transformer 8, the driving circuit is made more compact than the prior art. The frequency of the signal from the oscillator 4 is four times as high as the motor drive frequency. It is therefore possible to increase the driving efficiency of the transformer 8 and prevent the transformer 8 from being significantly heated as well as to make the transformer 8 more compact.

The frequency of the signal from the oscillator 4 may be set to 1280 kHz, and be divided by 32 by the phase shifter 5, thereby providing a 40-kHz signal.

SECOND EMBODIMENT

Figure 4:
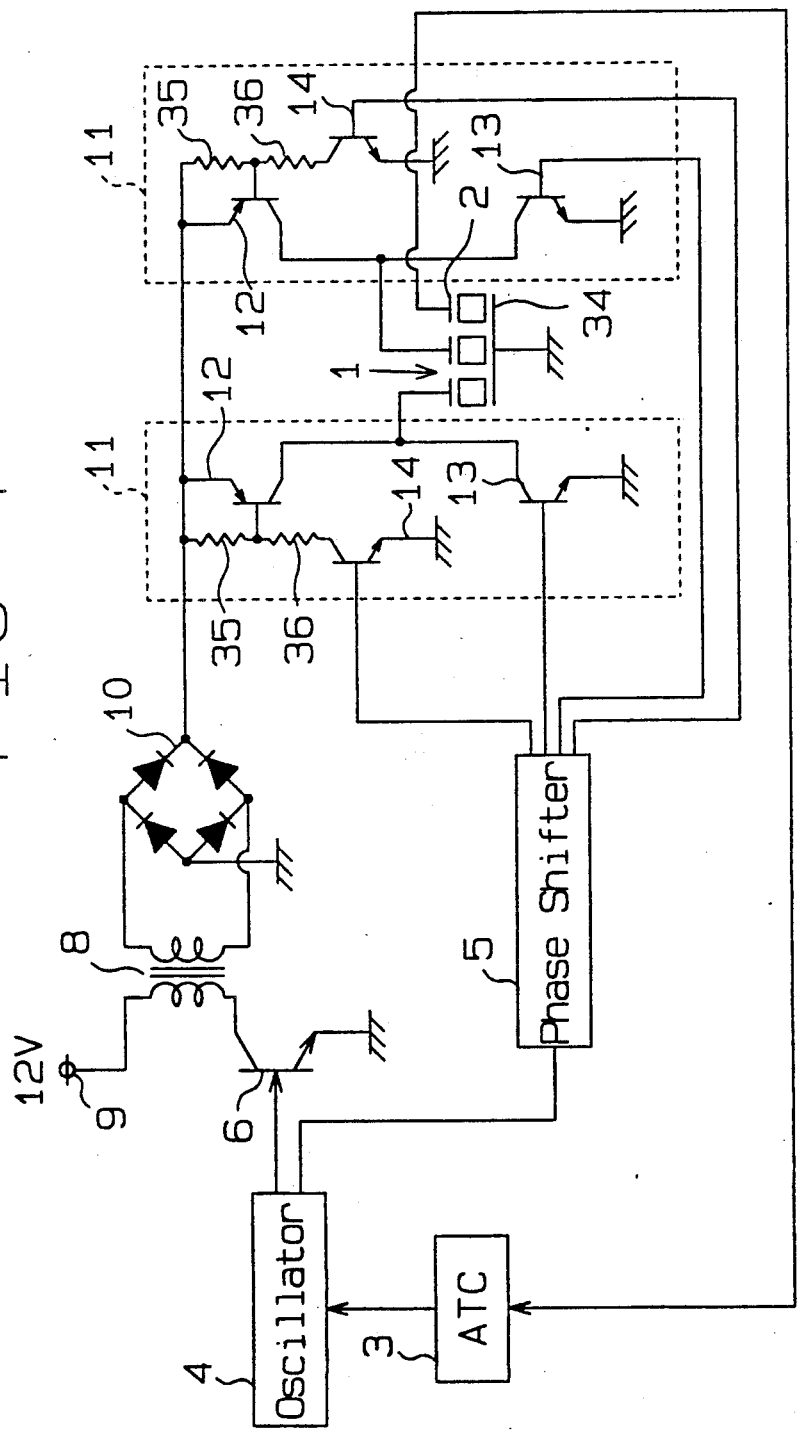
FIG. 4 is a circuit diagram showing a driving circuit of the second embodiment.

The driving circuit according to the second embodiment will now be described referring to FIG. 4. This circuit includes a pair of switching circuits 11 each having three switching elements, in place of the switching elements 7 in the driving circuit according to the first embodiment.

The oscillator 4 sends a signal whose frequency is approximately four times the motor drive frequency, to the switching element 6 and the phase shifter 5, as per the first embodiment. The switching element 6 performs the switching operation based on the signal from the oscillator 4 to drive the transformer 8. The transformer 8 generates a high AC voltage, which is converted into a DC voltage by the rectifier 10.

The phase shifter 5 divides the signal from the oscillator 4 by four, and converts the resultant signal into four signals of different phases. These signals are sent to the respective switching circuits 11.

Each switching circuit 11 includes a first, second and third switching elements 12, 13 and 14. The first switching element 12 charges one of the separated portions 1a or 1b of the piezoelectric element 1. The second switching element 13 discharges the piezoelectric element 1 of the charge accumulated therein. And the third switching element 14 drives the first switching element 12.

A PNP transistor is used as the first switching element 12. The output terminal of the rectifier 10 is connected directly to the emitter of the switching element 12, and is also connected to the base of the switching element 12 via a resistor 35. The collector of the switching element 12 is connected to one of the portions (1a or 1b) of the piezoelectric element 1. The center electrode 34 of the piezoelectric element 1, which is not connected to the first switching element 12, is grounded.

An NPN transistor is used as the second switching element 13. The transistor has its base connected to the phase shifter 5, its emitter grounded and its collector connected to the collector of the first switching element 12.

An NPN transistor is also used as the third switching element 14. The transistor has its base connected to the phase shifter 5, its emitter grounded and its collector connected via a resistor 36 to the base of the first switching element 12.

The resistors 35 and 36 prevent the switching elements 12 and 14 from being damaged by an overcurrent generated when the third element 14 is turned on. Further, these resistors 35 and 36 serve to provide a potential difference between the emitter of the first switching element 12 and the collector of the third switching element 14. This potential difference causes a base current to be generated in the first switching element 12.

The driving circuit of the second embodiment has a better response than the circuit of the first embodiment, and can rotate the rotor 32 smoothly and surely.

THIRD EMBODIMENT

Figure 5:
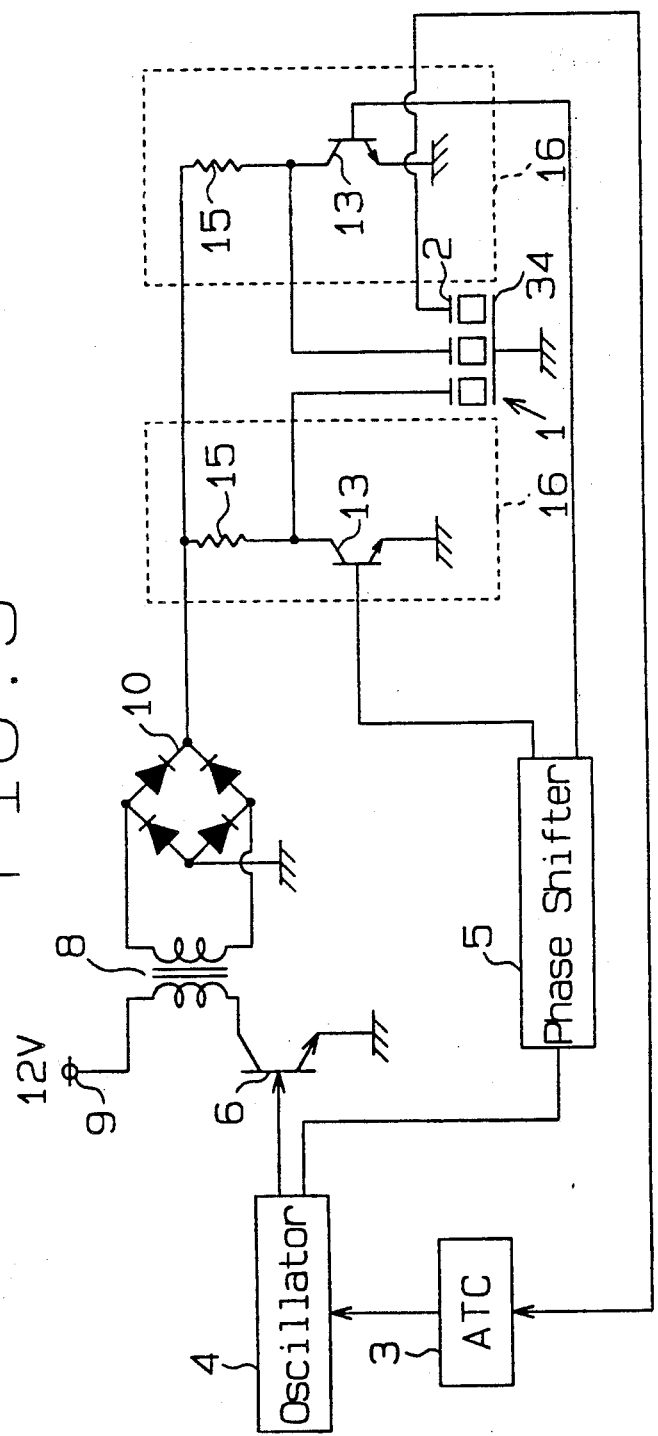
FIG. 5 is a circuit diagram depicting a driving circuit of the third embodiment.

A driving circuit according to the third embodiment will be described below referring to FIG. 5. This driving circuit has a simple switching circuit 16 comprising the second switching element 13 and a resistor 15, instead of the switching circuit 11 shown in the second embodiment.

The resistor 15 has one end connected to the output terminal of the rectifier 10, and the other end connected to the collector of the second switching element 13 and to one of the portions 1a or 1b of the piezoelectric element 1. The resistor 15 serves to adjust the amount of electric charge to be applied to the piezoelectric element 1, as well as to prevent an overcurrent from flowing through the switching element 14. The switching element 13 discharges the piezoelectric element 1 of the charge accumulated therein according to the signal from the phase shifter 5, in the same manner as done in the second embodiment.

The switching circuit 16 with the above structure has superior durability and lower production costs than the switching circuit 11 of the second embodiment. However, switching circuit 16 is a little inferior in terms of motor response. Therefore, it is preferable that the circuit of this embodiment or the one according to the second embodiment be selected depending on the application of the ultrasonic motor.

FOURTH EMBODIMENT

Figure 6:
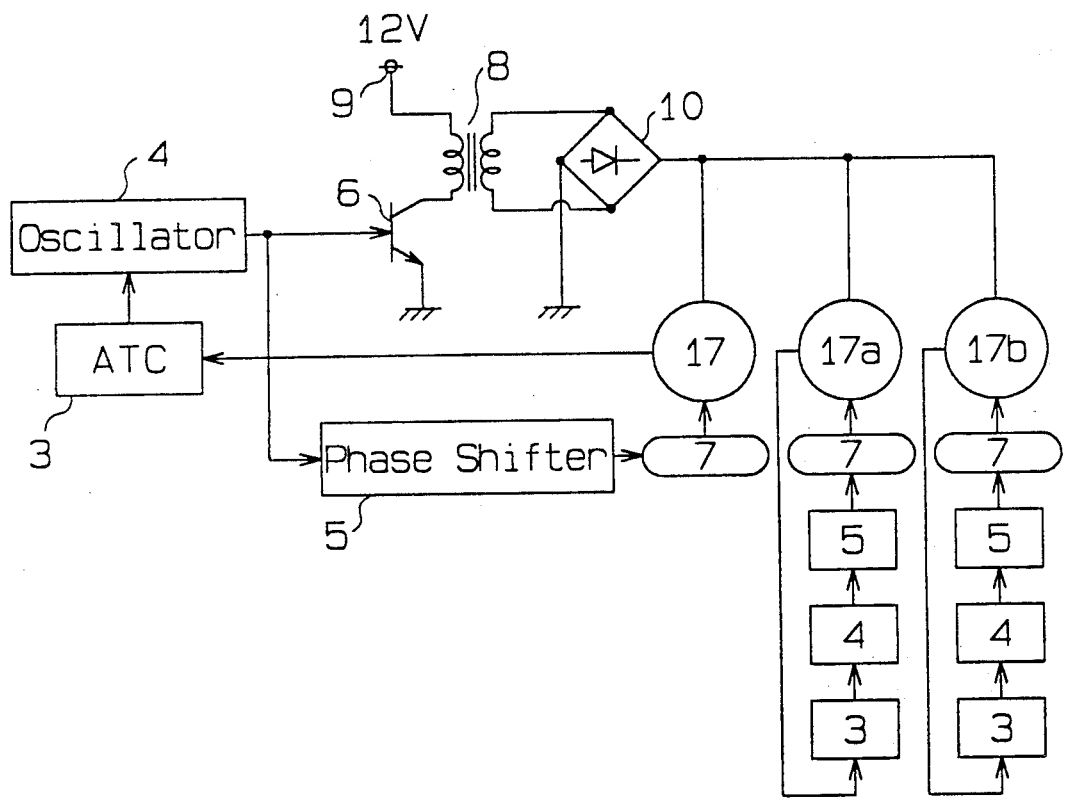
FIG. 6 is a circuit diagram illustrating a driving circuit of the fourth embodiment.
Figure 7:
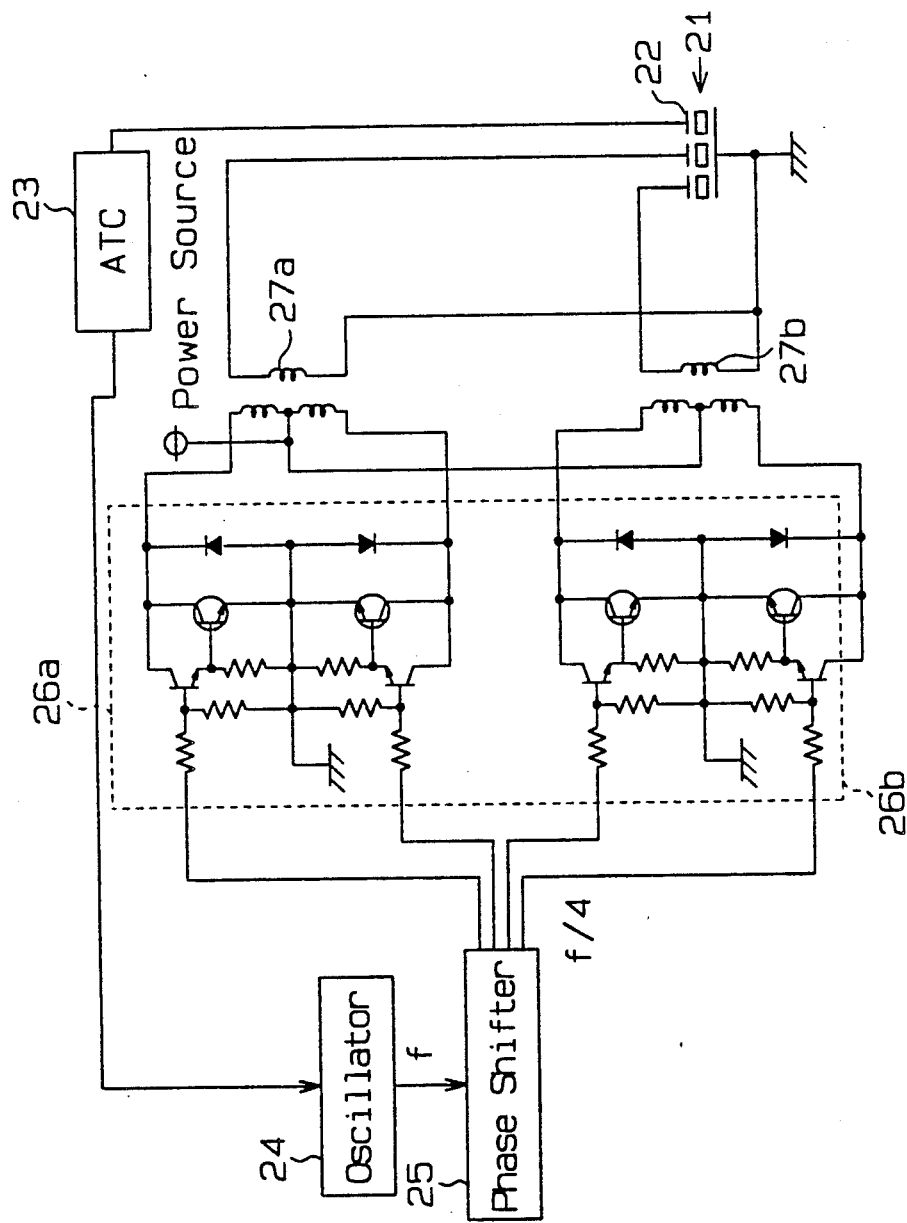
FIG. 7 is a circuit diagram of a conventional driving circuit.

One embodiment of a driving circuit for driving multiple ultrasonic motors (three in this embodiment) will now be described referring to FIG. 6. This driving circuit is structured by a combination of driving circuits including the same switching elements 6 and 7 as used in the first embodiment.

One ultrasonic motor 17 is driven by a driving circuit having the same structure as that of the first embodiment. A DC voltage output from the rectifier 10 in this circuit is distributed as a drive signal to individual motors 17, 17a, and 17b.

The motors 17a and 17b each have a control circuit for controlling the voltage applied to their associated piezoelectric elements, in accordance with the voltage from a monitor motor electrode provided at part of that piezoelectric element. Each control circuit is constituted by connecting in a loop the monitor electrodes of the piezoelectric elements of the motor 17a (or 17b), the ATC 3, the oscillator 4, the phase shifter 5, the switching element 7, and the center electrodes of the piezoelectric elements of the motor 17a (or 17b).

According to this embodiment, multiple motors can be driven by a driving circuit including only one transformer 8 and only one rectifier 10. It is therefore possible to make the entire motor system compact.

Although only four embodiments of the present invention have been described herein, it should be apparent to those skilled in the art that the present invention may be embodied in many other specific forms without departing from the spirit or scope of the invention.

Therefore, the present examples and embodiments are to be considered as illustrative and not restrictive and the invention is not to be limited to the details given herein, but may be modified within the scope of the appended claims.

We claim:

1. A driving circuit for an ultrasonic motor including a stator, a rotor supported rotatable on the stator, and a piezoelectric element provided on the stator, the piezoelectric element having two separate portions, the rotor being driven by applying high frequency drive voltages of different phases to the respective portions of the piezoelectric element, the driving circuit comprising:
   an oscillator for outputting an oscillator signal having a frequency N times the frequency of the drive voltages;
   a switching device for outputting a switching signal upon reception of the oscillator signal from the oscillator;
   a transformer including,
      a primary coil having a first end connected to a DC power source, and a second end connected to the switching device, and
      a secondary coil for generating an AC voltage according to the switching signal from the switching device with respect to the primary coil;
   a rectifier for converting the AC voltage from the secondary coil into a DC voltage to be applied to the piezoelectric element;
   a phase shifter for frequency-dividing the signal from the oscillator by N, generating a plurality of frequency-divided signals of different phases, and outputting the signals separately;
   a first switch means for selectively applying a voltage to a first portion of the piezoelectric element, based on a first signal from the phase shifter; and
   a second switch means for selectively applying a voltage to a second portion of the piezoelectric element, based on a second signal from the phase shifter.

2. A driving circuit according to claim 1, wherein the first and second switch means each comprise a switching element.

3. A driving circuit according to claim 1, wherein the first and second switch means each comprise:
   a first switching element for selectively charging an associated portion of the piezoelectric element; and
   a second switching element for selectively discharging the associated portion of the piezoelectric elements of the charge accumulated therein.

4. A driving circuit according to claim 3, wherein:
   the phase shifter frequency-divides the signal from the oscillator by N, generates four frequency-divided signals of different phases, and outputs the four signals separately; and
   the first switching elements and the second switching elements are selectively controlled on the basis of the signals from the phase shifter.

5. A driving circuit according to claim 1, wherein the first and second switch means each comprise:
   a resistor coupled between the output of the rectifier and an associated portion of the piezoelectric element for charging the associated portion of the piezoelectric element; and
   a switching element for discharging the associated portion of the piezoelectric element of the charge accumulated therein.

6. A driving circuit according to claim 5, wherein the phase shifter frequency-divides the signal from the oscillator by N, generates a pair of frequency-divided signals of different phases, and outputs the four signals separately; and
   the switching elements of the first and second switch means are selectively controlled on the basis of the signals generated by the phase shifter.

7. A driving circuit according to claim 1, wherein N is equal to four.

8. A driving circuit according to claim 1, wherein the oscillator outputs a signal having a predetermined frequency in accordance with a signal from a monitor electrode provided between the separated portions of the piezoelectric element.

9. A driving circuit for a plurality of ultrasonic motors each including a stator, a rotor supported rotatable on the stator, and a piezoelectric element provided on the stator, the piezoelectric element having two separated portions, the rotor being driven by applying high frequency drive voltages of different phases to the respective portions of each piezoelectric element, the driving circuit comprising:
- a plurality of oscillators, each oscillator outputting an oscillator signal having a frequency N times the frequency of the drive voltage of an associated motor;
- a switching device for outputting a switching signal upon reception of the oscillator signal from one of the oscillators;
- a transformer including,
  - a primary coil having a first end connected to a DC power source, and a second end connected to the switching device, and
  - a secondary coil for generating an AC voltage according to the switching signal from the switching device with respect to the primary coil;
- a rectifier for converting the AC voltage from the secondary coil of the transformer into a DC voltage to be applied to the individual piezoelectric elements of each of the motors;
- a plurality of phase shifters each for frequency-dividing the signal from an associated one of the oscillators by N, generating a plurality of frequency divided signals of different phases, and outputting the signals separately;
- a plurality of first switch means each for selectively applying a voltage to a first portion of an associated piezoelectric element, based on a first signal from an associated one of the phase shifters; and
- a plurality of second switch means each for selectively applying a voltage to a second portion of an associated piezoelectric element, based on a second signal from an associated phase shifter.

10. A driving circuit according to claim 9, wherein each of the first and second switch means includes a switching element.

11. A driving circuit according to claim 9, wherein N is equal to four.

* * * * *